United States Patent
Schroeder

[15] 3,689,647
[45] Sept. 5, 1972

[54] NOVEL METHOD OF CONTROLLING NEMATODES

[72] Inventor: Paul Herman Schroeder, Medina, N.Y.

[73] Assignee: FMC Corporation, New York, N.Y.

[22] Filed: Nov. 26, 1969

[21] Appl. No.: 880,382

Related U.S. Application Data

[63] Continuation-in-part of Ser. No. 605,982, Dec. 30, 1966, abandoned.

[52] U.S. Cl.................................................424/200
[51] Int. Cl. ...........................A01n 9/22, A01n 9/36
[58] Field of Search.................424/200; 260/294.8 K

[56] References Cited

UNITED STATES PATENTS 3,244,586  4/1966  Rigterink...................424/200
3,326,752  6/1967  Rigterink...................424/200

*Primary Examiner*—Stanley J. Friedman
*Attorney*—Pauline Newman, Henry R. Ertelt and Eugene G. Seems

[57] ABSTRACT

Nematodes and other parasitic worm life in the soil are controlled by application of pyridonyl phosphates of the general formula

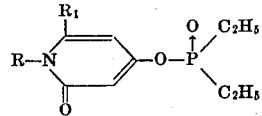

wherein R and $R_1$ are each low molecular weight hydrocarbon radical. The preparation and physical properties of representative compounds of this class, and their application for the control of nematodes, are illustrated.

7 Claims, No Drawings

NOVEL METHOD OF CONTROLLING NEMATODES

CROSS REFERENCE TO RELATED APPLICATIONS

This application is a continuation-in-part of copending application Ser. No. 605,982, filed Dec. 30, 1966, now abandoned and is related to Ser. No. 880,381 filed Nov. 26, 1969 which is a continuation-in-part of Ser. No. 605,993, filed Dec. 30, 1966 now abandoned.

FIELD OF THE INVENTION

This invention pertains to the chemical control of agricultural pests, particularly to the control of nematodes by means of certain novel pyridonyl phosphates.

While it has long been recognized that insects cause extensive crop damage, the more subtle damage caused by nematodes has been recognized only within recent years. Even though crop loss due to nematode damage has been estimated in the hundreds of millions of dollars in the United States alone, much of this damage is still unrecognized or unnoticed by the grower. While chemical control of insects is common, chemical control of nematodes is relatively new. The search for effective nematicides has been complicated by the highly specific nature of nematicidal activity, as well as by the absence of any useful correlation between insecticidal activity and nematicidal activity. Compounds highly effective against insects are frequently completely inactive against nematodes.

The first effective nematicides were volatile chemicals applied as soil fumigants. More recently certain non-volatile nematicides have been discovered. However, the novel properties and the high degree of nematicidal activity shown by the compounds disclosed herein have not previously been reported or suggested.

SUMMARY OF THE INVENTION

This invention pertains to a novel method of controlling nematodes and other parasitic worm life existing in the soil at some stage of its life cycle, e.g. as eggs, larvae, or adults. The method comprises the application of certain pyridonyl phosphates to the pests to be controlled, or to the soil in which they live. Effective control is obtained without injury to plants growing in soil treated by the method of invention.

DETAILED DESCRIPTION

The active nematicidal compounds of this invention are pyridonyl phosphates of the formula

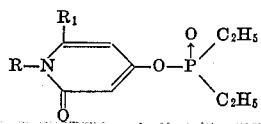

where R and $R_1$ are each a monovalent lower hydrocarbon radical. In the R and $R_1$ radicals, it is preferred that no carbon atom be spaced from the valence bond (to which R or $R_1$ is attached) by more than four intervening carbon atoms; examples of R and $R_1$ radicals are methyl, n-propyl, benzyl, phenyl, allyl, methallyl, butenyl-2, and butenyl-3. Preferred R groups are lower alkyl, lower alkenyl, or benzyl. Preferred $R_1$ groups are lower alkyl.

Particularly preferred are those compounds in which R is an alkyl of one to four carbon atoms inclusive or an alkenyl of two to four carbon atoms inclusive and $R_1$ is methyl or ethyl.

The active nematicides of the invention may be prepared, for example, by reacting a phosphorus compound of the formula:

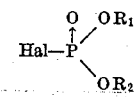

where "Hal" is halogen, preferably chlorine, or bromine, with a 4-hydroxy-2-keto-1,2-dihydropyridine, of the formula:

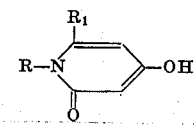

preferably in equimolecular proportions, with the elimination of hydrogen halide. The reaction is carried out in the presence of a hydrogen halide binding agent; for example, an alkali metal carbonate such as potassium carbonate. A solvent for the reactants should also be present and is preferably a polar solvent such as ethanol, dimethylformamide, acetonitrile, dimethyl sulfoxide, or an acetone/water mixture. The reaction is preferably conducted with heating, at a temperature of from 25° to 60° C. or at the reflux temperature of the reaction mixture. The reaction may be performed in the absence of a halogen halide binding agent if the dihydropyridine has an —OM substituent (where M is a metal, e.g. potassium) in place of its —OH substituent. The reaction product may be recovered from the reaction mixture by adding the latter to an ice-water mixture, separating the organic layer and washing that layer with water to purify the water-insoluble, xylene-soluble reaction product.

The dihydropyridine compound used in the reaction may be produced, using well-known reaction techniques, from dehydroacetic acid (when $R_1$ is methyl in the formula below) or homologous compound, by the following reaction sequence:

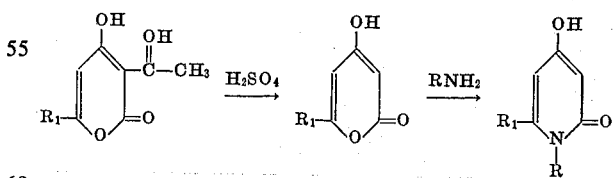

a dehydroacetic acid

DETERMINATION OF NEMATICIDAL ACTIVITY

Control of nematodes was measured as follows: A nematode-infested soil was prepared by mixing larvae of the root-knot nematode (Meloidogyne incognita) into sandy loam soil so that the number of larvae in a given volume of soil was known. Into this infested soil was blended sufficient active ingredient, formulated as a 5 percent dust on attapulgite clay, to give a concentration of 25 ppm. These mixtures were held in the greenhouse under moist conditions for four days. Then young tomato plants were planted, each in a pot containing a volume of infested soil known to contain about 1,000 larvae, and allowed to grow for four weeks. At the end of this time, the roots of the tomato plants were freed of soil and the degree of infestation was evaluated in comparison with the check plants grown in nematode-infested soil which had received no chemical treatment. In each test the roots of the check plants were severely galled. When control of nematodes was complete, there were no galls on the roots. Intermediate degrees of control were estimated as a percentage of control relative to the untreated check plants.

Evaluations of nematode control at lower rates were carried out in the same manner except smaller quantities of 5 percent dust were mixed into the soil, and in some tests the young plants were allowed to grow for 6 weeks instead of 4.

PREPARATION OF NEMATICIDAL COMPOUNDS

The preparation of representative nematicidal phosphates of this invention, and their nematicidal properties, are illustrated in the following examples, which are in no sense limitative of the scope of the invention. In the examples all temperatures are in degrees centigrade and all parts are by weight unless otherwise stated

EXAMPLE 1

0,0-Diethyl0-(1,2-Dihydro-2-keto-1,6-dimethyl-4-pyridyl) Phosphate

Sulfuric acid, S.G. 1.84 (379 ml) was added to distilled water (53 ml). The resulting solution was then heated and stirred in an oil bath at 74° C. Dehydroacetic acid (250 g) was then dissolved in the sulphuric acid solution and heated to 120° C. during 40 minutes. The solution was then tested for completeness of reaction by adding a few drops of the reaction mixture to water. If the reaction had been completed, no immediate precipitate was observed. The solution was cooled to 20°–25° C., and poured onto flaked ice (1 kg) and stirred for 1 hour. The mixture was then filtered, washed with a little cold water, and dried to give the crude product (129 g) in 68.7 percent yield. This material was suitable for the next stage. 30 grams of the above, on recrystallization from water* (*The temperature of the water should not exceed 70° C., since decomposition occurs above this temperature.) (270 ml) gave pure 4-hydroxy-6-methylpyran-2-one (18.6 g) having a melting point of 186°–188° C.

4-Hydroxy-6-methylpyran-2-one (66 g) was dissolved in 25–30 percent aqueous methylamine (135 ml) and stirred at 80° for 2 hours. The solution was cooled, acidified slowly to pH 5 by the addition of concentrated hydrochloric acid to the stirred solution. The product so obtained was filtered and dried to yield 53 g of crude product, which on crystallization from water (600 ml) yielded 38 g of pure 1,2-dihydro-4-hydroxy-1,6-dimethylpyrid-2-one, m.p. 226°–9°.

1,2-Dihydro-4-hydroxy-1,6-dimethylpyrid-2-one (10.0 g), anhydrous potassium carbonate (27.6 g) and acetone (250 ml) were stirred for 1 hour at 50° C. 0,0-Diethyl phosphorochloridate (10.5 g) was added dropwise over 30 minutes and the mixture was stirred for a further 2 hours at 50° C. The mixture was then allowed to stand overnight.

Inorganic salts were then removed by filtration and the solvent removed in vacuo. The residual oil was dissolved in benzene (150 ml) and washed with a 2N solution of sodium hydroxide (3 × 100 ml), water (100 ml) and a saturated solution of sodium chloride, then dried over anhydrous sodium sulfate. Removal of the solvent in vacuo yielded 0,0-diethyl 0-(1,2-dihydro-2-keto-1,6-dimethyl-4-pyridyl) phosphate as a pale oil, $n_D^{25}$ 1.5186 (phosphorus content: theory 11.27 percent; found on analysis 11.4 percent) The product had excellent nematicidal activity.

EXAMPLE 2

0,0-Diethyl 0-(1-Allyl-1,2-dihydro-2-keto-6-methyl-4-pyridyl) Phosphate

By the procedure of Example 1 allylamine was reacted with 4-hydroxy-6-methylpyran-2-one to yield 1-allyl-1,2-dihydro-6-methylpyrid-2-one which was then reacted with 0,0-diethyl phosphorochloridate to give 0,0-diethyl 0-(1-allyl-1,2-dihydro-2-keto-6-methyl-4-pyridyl) phosphate, refractive index $n_D^{20}$ 1.5130.

At 5 ppm this compound gave complete control of nematodes.

EXAMPLE 3 0,0-Diethyl 0-(1,2-Dihydro-1-ethyl-2-keto-6-methyl-4-pyridyl) Phosphate By the procedure of Example 1 1,2-dihydro-1-ethyl-6-methylpyrid-2-one, prepared from ethylamine and 4-hydroxy-6-methylpyran-2-one, was reacted with 0,0-diethyl phosphorochloridate to give 0,0-diethyl 0-(1,2-dihydro-1-ethyl-2-keto-6-methyl-4-pyridyl) phosphate, refractive index $n_D^{20}$ 1.4974.

At 5 ppm this compound gave complete control of nematodes.

EXAMPLE 4 0,0-Diethyl 0-(1,2-Dihydro-2-keto-6-methyl-1-n-propyl-4-pyridyl) Phosphate By the procedure of Example 1, 1,2-dihydro-6-methyl-1-n-propylpyrid-2-one, prepared from n-propylamine and 4-hydroxy-6-methylpyran-2-one, was reacted with 0,0-diethyl phosphorochloridate. After being washed with sodium hydroxide and dried as described in Example 1, the product in benzene/hexane (1:1) was passed through a column of acid-washed alumina. After removal of solvent the product was dissolved in hot di-isopropyl ether. The cooled solution gave solid 0,0-diethyl 0-(1,2-dihydro-2-keto-6-methyl-1-n-propyl-4-pyridyl) phosphate, m.p. 42°–44°.

At 5 ppm this compound gave complete control of nematodes.

In a similar manner 0,0-diethyl0-(1,2-dihydro-2-keto-6-methyl-1-i-propyl-4pyridyl) phosphate was prepared. This compound gave complete control of nematodes at 5 ppm.

Other nematicidal compounds of this invention may be prepared in a manner similar to that described above.

The active chemical compounds of the invention, like most agricultural chemicals, are not usually applied full strength. They are generally incorporated with the adjuvants and carriers normally employed for facilitating dispersion of active ingredients for agricultural chemical applications, recognizing the accepted fact that the formulation and mode of application may affect the activity of the material. The toxicants of this invention may be applied as a spray, dust, or granule. They may be formulated as granules of large particle size, as powdery dusts, as wettable powders, as emulsifiable concentrates, or as solutions. More preferably, they are applied dispersed on granular carriers, or as wettable powder.

In granular formulations, for example, the toxicant is spread on the surface of, or absorbed in, a granular carrier which may be inert or may be a fertilizer or other active material.

Wettable powders are in the form of finely divided particles which disperse readily in water or other dispersant, normally due to the presence of a dispersing agent. The powder may be applied to the soil either as a dry dust or preferably as an emulsion in water. Typical carriers include fuller's earth, kaolins, silicas, and other highly absorbent organic diluents. Typical wetting, dispersing, or emulsifying agents used in agricultural formulations include, for example, the alkyl and alkylarylsulfonates and sulfates and their sodium salts, alkyl-amide sulfonates, including fatty methyl taurides; alkylaryl polyether alcohols, sulfated higher alcohols, and polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface-active agents are available in commerce. The surface-active agent when used, normally comprises from 1 percent to 15 percent by weight of the nematicidal composition.

The active ingredient, when mixed with a finely ground solid such as talc, may be applied as a dust; or it may be combined with a solvent and a wetting agent in the form of an emulsifiable concentrate which is then diluted further with water for application to the soil. All of these techniques for formulating and applying active ingredients to the soil are well known in the art. Typical formulations are:

Wettable Powders:

| | |
|---|---|
| Active ingredient | 25.00% w/w |
| Sodium lignosulfonate | 1.50% |
| Sodium alkylnaphthalenesulfonate | 1.50% |
| Attapulgite clay | 72.00% |

Emulsifiable Concentrates:

| | |
|---|---|
| Active ingredient | 20.00% |
| Calcium alkylbenzenesulfonate | 3.00% |
| Polyalkylene glycol ethers | 2.00% |
| Xylene | 75.00% |

Dusts:

| | |
|---|---|
| Active ingredient | 5.00% w/w |
| Sodium lignosulfonate | 1.90% |
| Sodium alkylbenzenesulfonate | 1.90% |
| Attapulgite clay (325 mesh) | 91.20% |

Granules:

| | |
|---|---|
| Active ingredient | 15.15% w/w |
| Isophorone | 15.15% |
| Attapulgite clay (24/48 mesh) | 69.70% |

In each of the above formulations the preferred active ingredient is O,O-diethyl O-(1,2-dihydro-2-keto-1,6-dimethyl-4-pyridyl) phosphate. This compound may be replaced by, or combined with, other active compounds of this invention.

The rate of application of the active ingredient to the soil may be, for example, in the range of about 0.2 to 500 pounds per acre, and the concentration of the active ingredient in the soil may be, for instance, in the range of about 0.1 to 100 ppm. The active ingredients described herein have been found to have high nematicidal activity even at low concentrations.

I claim:

1. The method of controlling nematodes in the soil which comprises applying thereto a nematicidal amount of a compound of the formula

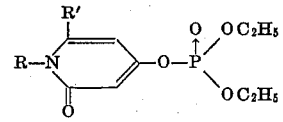

where R and R' are each lower alkyl, lower alkenyl, or benzyl.

2. The method of claim 1 in which R' is lower alkyl.

3. The method of claim 1 in which R is alkyl of one to four carbon atoms inclusive or alkenyl of two to four carbon atoms inclusive and R' is methyl or ethyl.

4. The method of claim 1 in which the compound is O,O-diethylO-(1,2-dihydro-2-keto-1,6-dimethyl-4-pyridyl) phosphate.

5. The method of claim 1 in which the compound is O,O-diethylO-(1-allyl-1,2-dihydro-2-keto-6-methyl-4-pyridyl) phosphate.

6. The method of claim 1 which comprises applying to nematode-infested soil a nematicidal amount of an aqueous dispersion of said compound.

7. The method of claim 1 which comprises applying to nematode-infested soil a nematicidal amount of said compound on an inert granular carrier.

* * * * *